Jan. 31, 1967 F. E. HALLECK 3,301,848
POLYSACCHARIDES AND METHODS FOR PRODUCTION THEREOF
Filed Oct. 24, 1963 5 Sheets-Sheet 1

INVENTOR.
FRANK E. HALLECK
BY
Ronald E. Lund
ATTORNEY

Jan. 31, 1967 F. E. HALLECK 3,301,848
POLYSACCHARIDES AND METHODS FOR PRODUCTION THEREOF
Filed Oct. 24, 1963 5 Sheets-Sheet 3

INVENTOR.
FRANK E. HALLECK
BY Ronald E. Lund
ATTORNEY

INVENTOR.
FRANK E. HALLECK
BY
Ronald E. Lund
ATTORNEY

Fig 9

United States Patent Office 3,301,848
Patented Jan. 31, 1967

3,301,848
POLYSACCHARIDES AND METHODS FOR
PRODUCTION THEREOF
Frank E. Halleck, Minnetonka, Minn., assignor to The Pillsbury Company, Minneapolis, Minn., a corporation of Delaware
Filed Oct. 24, 1963, Ser. No. 319,093
22 Claims. (Cl. 260—209)

This application is a continuation-in-part of earlier filed co-pending application Serial No. 235,904, filed October 30, 1962, now abandoned.

This invention relates generally to novel polysaccharides and methods for the production thereof. More particularly, it relates to a class of new polysaccharides which are produced microbiologically from the action of certain molds on carbohydrate substrates, and to chemical derivatives of such polysaccharides.

It is known that polysaccharides are produced by the action of certain micro-organisms on certain carbohydrates. For example, if an aqueous medium containing sucrose in inoculated with the microorganism *Leuconostoc mesenteroides* and the inoculated medium is incubated at about 25° C., dextran, a high molecular weight polysaccharide, is produced. It is also known that some organisms of the *Xanthomonas* genus produce hetero-polysaccharides when incubated in certain carbohydrate-containing media.

It has now been discovered that certain molds will produce very novel and highly useful polysaccharides when incubated in a medium containing carbohydrate source materials. In general, this new class of polysaciharides is characterized by a multiplicity of D-glucose units attached together in a straight chain through beta 1,3 linkages. The class is further characterized by the presence of appended glucose units attached at various intervals to the main chain through beta 1,6 linkages. Thus, the structure can be categorized most generally as follows. As will be more fully brought out below, this structure is very unique and advantageous.

Where the letter G refers to glucopyranose and linkages of either beta 1,6 or beta 1,3 are as indicated.

Organisms which produce members of this new class of polysaccharides include *Sclerotium glucanicum*, Pillsbury Culture Code No. 13, n.sp. (NRRL 3006); *Sclerotium delphinii* Jersveld/Welch, Pillsbury Culture Code No. 53 (Source: Centraalbureau Voor Schimmelcultures Baarn, Netherlands); *Sclerotium delphinii* Welch/White, Pillsbury Culture Code No. 46 (Source: Cantraalbureau); *Sclerotium rolfsii* Barnett, Pillsbury Culture No. 32 (Source: H. Barnett, University of West Virginia, Morgantown, West Virginia); *Sclerotium rolfsii* Barnett, Pillsbury Culture Code No. 31 (Source: H. Barnett, University of West Virginia, Morgantown, West Virgninia); *Sclerotium rolfsii* Barnett, Pillsbury Cultore Code No. 27 (Source: H. Barnett, University of West Virginia, Morgantown, West Virginia); *Sclerotium rolfsii* Barnett, Pillsbury Culture Code No. 26 (Source: H. Barnett, University of West Virginia, Morgantown, West Virginia); *Sclerotium rolfsii* Gilman, Pillsbury Culture Code No. 24 (Source: Jospeh Gilman, Iowa State University, Ames, Iowa); *Sclerotium delphinii* Gilman, Pillsbury Culture Code No. 23 (Source: Joseph Gilman, Ames, Iowa); *Sclerotium delphinii* Stevens I, Pillsbury Culture Code No. 19 (Source: Centraalbureau); *Sclerotium delphinii* Welch/Mix, Pillsbury Culture Code No. 9 (Source: Centraalbureau); *Sclerotium delphinii* Stevens, Pillsbury Culture Code No. 8 (Source: Centraalbureau); *Sclerotium cof-feicolum* Stahel, Pillsbury Culture Code No. 7 (Source: Centraalbureau); *Sclerotium rolfsii* QM, Pillsbury Culture Code No. 78 (Source: Quartermaster Food and Container Institute, United States Army, Natick, Massachusetts); *Sclerotium rolfsii* QM, Pillsbury Culture Code No. 79 (Source: Quartermaster Food and Container Institute, United States Army, Natick, Massachusetts); *Corticium rolfsii* Curzi/Balducci, Pillsbury Culture Code No. 52 (Source: Centraalbureau); *Corticium rolfsii* (Sacc) Curzi, Pillsbury Culture Code No. 51 (Source: Centraalbureau); *Corticium rolfsii* (Sacc) Curzi, Pillsbury Culture Code No. 50 (Source: Centraalbureau); *Corticium rolfsii* Curzi/Ficus, Pillsbury Culture Code No. 57 (Source: Centraalbureau); *Sclerotinia gladoli* Drayton/Massey, Pillsbury Culture Code No. 45 (Source: Centraalbureau); *Stromatinia narcissi* Groves, Pillsbury Culture Code No. 44 (Source: Centraalbureau).

One of the important advantages of the invention resides in the ability of the organisms listed above to produce polysaccharides from a plurality of carbohydrate sources. For example, *Sclerotium glucanicum* n.sp. (NRRL 3006) will produce polysaccharides from the carbohydrate source materials selected from the group consisting of sucrose, D-xylose, D-mannose, D-glucose (dextrose), L-arabinose, D-galactose, D-fructose, maltose, melezitose, raffinose, methylbeta-maltoside, aesculin, cellobiose, trehalose, L-rhamnose, glycerol, cellulose and xylan. The other organisms listed above operate on equally wide spectra of carbohydrate sources as will more fully be explained below. It should be noted that several utilize starch for polysaccharide production. In the aforementioned method of producing dextran by the action of *Leuconostoc mesenteroides*, only sucrose can be used as a carbohydrate source. The ability of the organisms of the present invention to act on a plurality of carbohydrate sources is highly advantageous in that the possibility of utilizing many waste materials as carbohydrate sources has for the first time become feasible.

The degree of polymerization reported herein is an average figure for material produced in most instances at one set of conditions. Other conditions may modify these values. Moreover, in any given sample of material, molecular weight varies widely about the average, many times as much as five times greater than the average.

In the interest of brevity, the invention will be illustrated in detail primarily by reference to the product scleroglucan which is produced by the aforementioned organism *Sclerotium glucanicum* n.sp. (NRRL 3006). The details of polysaccharide production utilizing the other above-listed organisms, the properties of the polysacharides produced thereby, the preparation of chemical derivatives from the other polysaccharides will be in most instances similar to scleroglucan. Specific details concerning the other organisms and the products produced therefrom will be set forth in tabular form after the detailed description of the scleroglucan.

In the following detailed description of the invention.

Production of scleroglucan

To produce scleroglucan, a carbohydrate from the group mentioned above is placed in an aqueous solution together with the organism *Sclerotium glucanicum* and incubated at appropriate temperatures until the desired level of polysaccharide production is attained. Although the enzyme system associated with *Sclerotium glucanicum* cells is capable of producing the polysaccharide in limited amounts, it is preferred that the culture medium contain nutrients for growth of the organism. Thus, it has been found that production yield is substantially increased by the presence of yeast extract or other suitable organic nitrogenous material. Of course, conventional mineral salts, such as the mineral salts contained in Czapek Dox Broth, are also desirably present to maximize yield of the polysaccharide.

Production of scleroglucan starts immediately upon inoculation of a culture medium and proceeds at a varying rate until the carbohydrate source is exhausted. Thereafter, if the organism is left in contact with the polysaccharide the organism begins to utilize the polysaccharide as a growth material. Under optimum conditions, the maximum polysaccharide yield will be obtained within 2 to 6 days.

Figure 1:
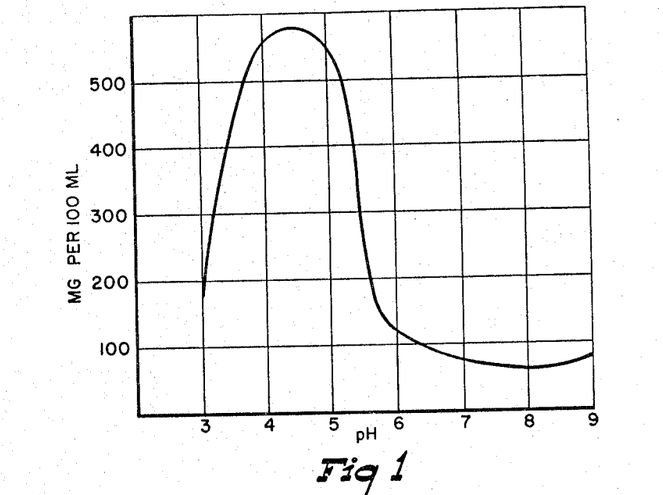
FIGURE 1 is a graph showing the effect of initial culture medium pH upon yield of scleroglucan.

Although not critical, the initial pH of the culture medium has an effect upon both the rate of production and the amount of polysaccharide produced. Reference is made to FIG. 1 which shows the effect of initial pH upon total yield. From FIG. 1, it may be seen that yield is not independent of initial pH. Although production of polysaccharide will occur throughout the initial pH range of 2 to 9, the yield is optimum within the initial pH range of 3.5 to 5.5.

Figure 2:
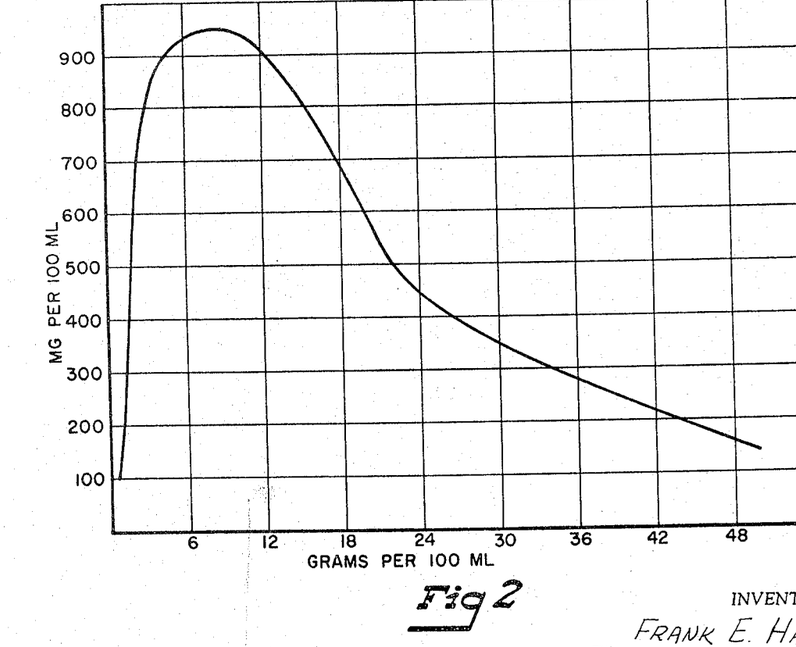
FIGURE 2 is a graph showing the yield of scleroglucan as a function of initial concentration of carbohydrate source material in the culture medium.

The initial concentration of carbohydrate source in the culture medium is similarly not critical. FIG. 2 illustrates the yield of polysaccharide per unit volume of culture medium for the initial concentration range of 0 to 50 percent by weight. From this figure, it can be seen that the optimum initial concentration range is approximately 3 to 15 percent by weight.

Also, the inoculum concentration in the initial culture medium is not critical. It is obvious, of course, that higher initial levels of inoculum concentration will provide a greater yield of polysaccharide in less time than will lower levels of initial concentration. In general, initial inoculum concentrations up to 10 percent by weight are suitable.

Polysaccharide production will occur within the temperature range of approximately 20 to approximately 37° C. Within this range, the range of 25 to 30° C. is preferred for optimum yield.

The organism *Sclerotium glucanicum* is aerobic as might be expected. Thus, aeration is essential to provide maximum rates of growth of the organism and of polysaccharide production. However, at high inoculum concentrations where the enzyme system associated with the organism is present at relatively high concentrations, polysaccharide production can proceed in the absence of oxygen.

As can be seen from FIG. 2, the liquor resulting from several days fermentation under favorable growth conditions contains approximately 600 to 900 milligrams of polysaccharide per 100 millimeters culture medium and is consequently quite viscous. As a first step in recovery of a pure product, the mycelium is separated from the water-soluble constituents of the fermentation liquor by any convenient technique. One such technique comprises diluting the fermentation liquor with an amount of water sufficient to produce a less viscous solution suitable for being filtered or centrifuged (e.g. from 1 to 3 parts fermentation liquor to 1 part water). After the resulting solution is filtered or centrifuged, the mycelium-free liquor which is obtained contains this water-soluble polysaccharide and other water-soluble constituents of the culture medium.

The next step is to separate the polysaccharide from the other water-soluble ingredients. This may be conveniently accomplished by precipitating the polysaccharide with any one of a number of water-miscible organic solvents, such as methyl, ethyl or propyl alcohols, or acetone. After precipitation, the polysaccharide is separated from the liquid by any convenient technique such as filtration, centrifugation, or decantation.

If desired, the product can be further purified by washing with any of the above-mentioned organic solvents or by redispersing the polysaccharide in water and reprecipitating in the same manner as described above. After the material is purified to the degree desired, it is then dried in any convenient manner. Suitable techniques include simple air drying, acetone drying, spray drying or drum drying. The above separation and purification procedure may be conducted at any convenient conditions of temperature and pressure.

The product which results is generally fibrous in nature and white in color. At times a gray or tan color is associated with the product, which color is caused by impurities, the nature of which are not presently known. Conventional purification techniques such as adsorption upon diatomaceous earth will remove most of these color-producing contaminants.

Although the product is useful in its fibrous form, it is generally more convenient for use if first reduced to a more particulate state. Any conventional method of size reduction such as grinding or milling may be used.

For some uses, for which a crude product is satisfactory, the above-outlined purification procedure may be unnecessary and the fermentation liquor may be merely dehydrated. The product which results contains the polysaccharide, mycelium, and all the impurities of the reaction mixture, but retains all of the desired properties of the polysaccharide. Alternatively, the liquor is merely treated with a water-miscible organic solvent and the precipitated polysaccharide recovered along with the mycelium. For economic reasons, the latter method is preferred for recovery of a crude product.

Properties of scleroglucan

Scleroglucan is readily dispersible in either hot or cold water and produced highly viscous gels when so dispersed. Gels containing only 0.8 percent by weight scleroglucan are firm enough to support themselves when placed on a flat surface at room temperature. In general, scleroglucan gels are quite resistant to the shearing action normally encountered in a Brookfield viscometer showing little if any decrease in viscosity as a result of being subjected to this action. As noted above, the pure polysaccharide is white in color; however, when dispersed in water, it forms gels which vary from transparent to translucent in appearance depending on concentration.

Figure 9:
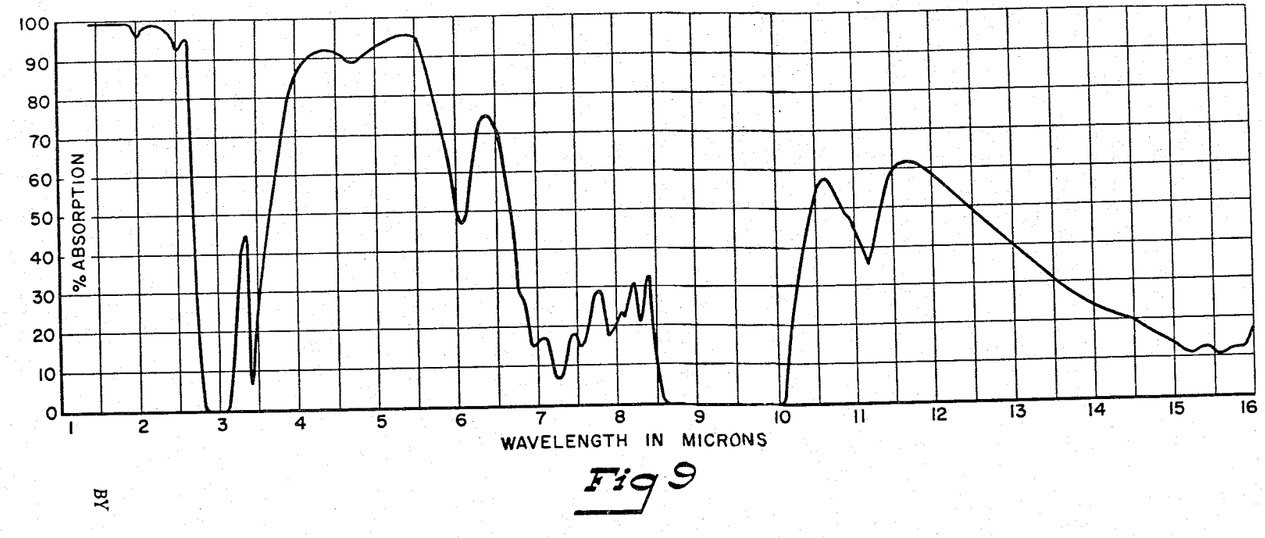
FIGURE 9 is the infra-red spectrum of scleroglucan.

When subjected to analysis by means of a polarimeter, samples of scleroglucan manifest an optical rotation of approximately $-1°$ in dilute sodium hydroxide which suggest the presence of only beta linkages within the molecule. The compound exhibits the infrared spectrum which is reproduced in FIG. 9.

Figure 3:
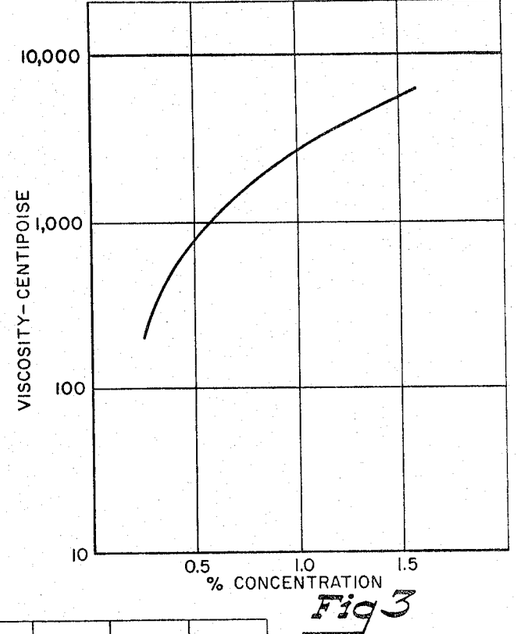
FIGURE 3 is a graph showing the viscosity of scleroglucan dispersions in water as a function of concentration.

As mentioned above, scleroglucan produces highly viscous gels when dispersed in water. FIG. 3 is a graph of viscosity as a function of concentration of scleroglucan in water plotted from data obtained using a Brookfield viscometer operated at 20 r.p.m. In this connection, it should be noted that gels formed from the polysaccharide manifest non-Newtonian flow characteristics.

Figure 4:
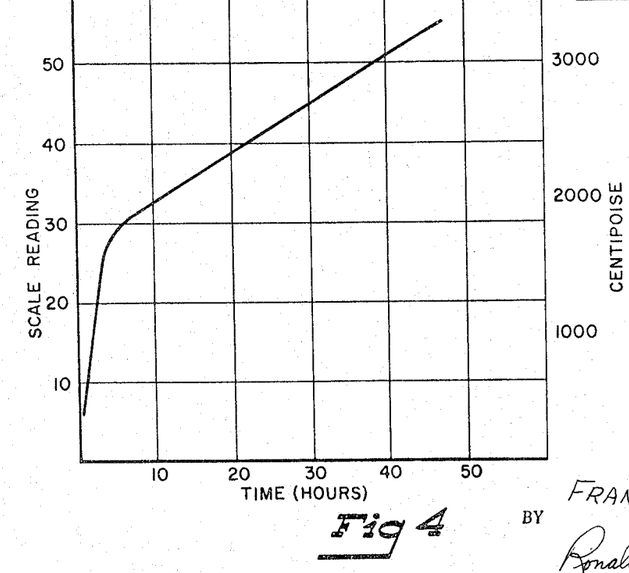
FIGURE 4 is a graphical illustration of the resistance of scleroglucan gels to flow as a function of time after dispersion.

Upon dispersing scleroglucan in water, viscosity increases rapidly during the initial portion of the hydration process but after a short time the increase becomes less rapid and continues over a relatively long period of time. FIG. 4, which is a plot of resistance to flow of a gel containing one percent scleroglucan, given in viscosity units on the right ordinate and in arbitrary units corresponding to scale readings taken from a Brookfield viscometer on the left ordinate, as a function of time plotted on the abscissa, illustrates this relationship. The data from which FIG. 4 was plotted were obtained using a Brookfield viscometer operating at a rotor speed of 20 r.p.m. From this graph it may be seen that viscosity increases very rapidly during the first few hours after dispersion of scleroglucan in water but after approximately five hours the rate of hydration and the accompanying increase in viscosity become less. This characteristic of the material is quite advantageous in situations where a gel formed from the material is handled (e.g. pumped) only during the first few hours after dispersion in water when its viscosity is low.

Figure 5:
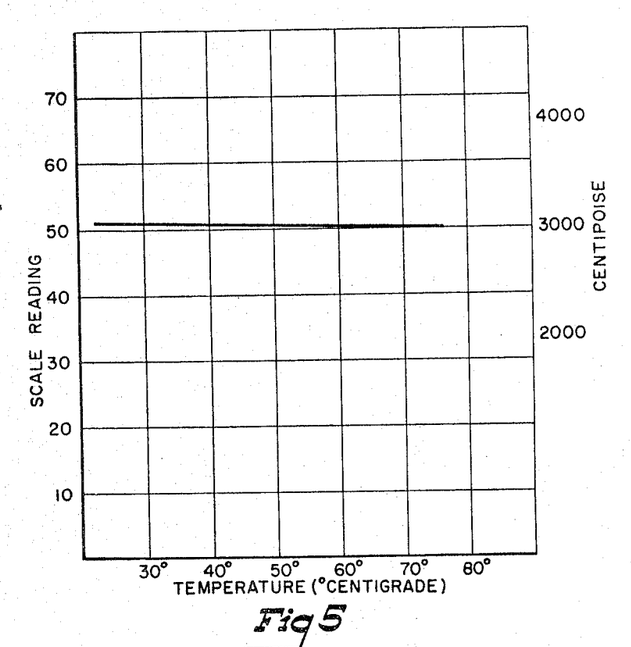
FIGURE 5 is a graph showing the temperature dependence of a dispersion of scleroglucan in water.

The viscosity of gels formed from scleroglucan is not particularly temperature dependent. FIG. 5 shows the temperature dependence of the viscosity of a 1 percent scleroglucan gel 24 hours after gel formation. Again, the data were collected using a Brookfield viscometer at a speed of 20 r.p.m. and the resistance to flow is given in terms of both viscosity and scale reading of the viscometer. It should be noted while FIG. 5 shows little temperature dependence at a viscometer speed of 20 r.p.m., it has been observed that the resistance of material to flow is somewhat more temperature dependent at higher viscometer rotor speeds.

Figure 6:
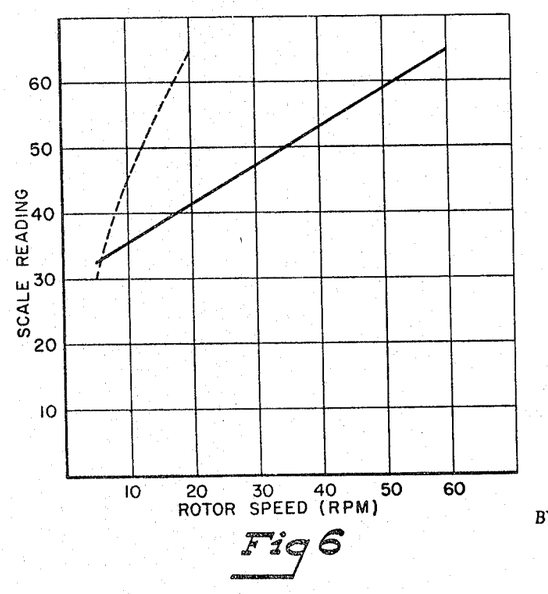
FIGURE 6 is a graph showing the resistance of scleroglucan to flow at various mixing speeds.

The flow characteristics of scleroglucan gels are highly advantageous as compared to gels formed from such natural gums as guar. FIG. 6, which is a graph of resistance to flow in arbitrary units (i.e., viscometer scale reading) plotted on the ordinate and rotor speed of the viscometer in r.p.m. plotted on the abscissa, illustrates this advantage very well. Dotted curve A shows the variation in resistance of flow with respect to rotor speed for a natural guar gum and solid curve B shows the same relationship for a scleroglucan gel. Both samples were tested 24 hours after dispersion of the respective gums in water, and both contained the same concentration of material.

From FIG. 6 it can be seen that scleroglucan gels show much less resistance to flow at high flow rates than do gels formed from guar gums. In situations where a gel must be pumped at high speeds, this characteristic is obviously highly advantageous.

Figure 7:
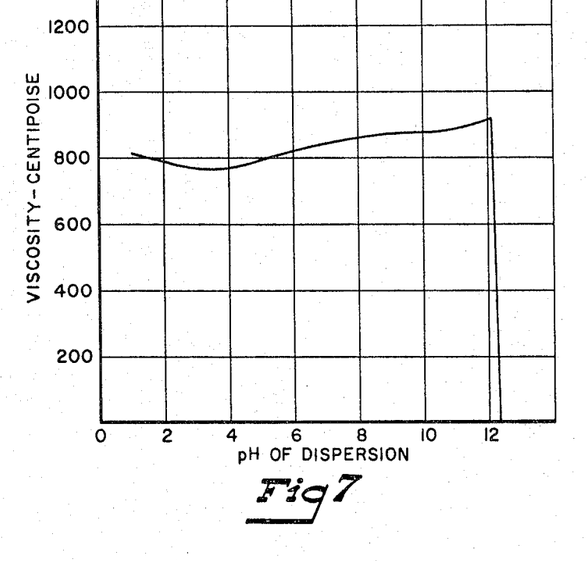
FIGURE 7 is a graph showing the viscosity of a scleroglucan gel as a function of pH.

Gels formed from scleroglucan are stable throughout the pH range of 1 to 12.2. FIG. 7 shows the viscosity of a 0.5 percent scleroglucan gel at 25° C. as a function of pH. The very sharp drop in viscosity which appears at approximately 12.2 to 12.3 indicates degradation of the gel.

Figure 8:
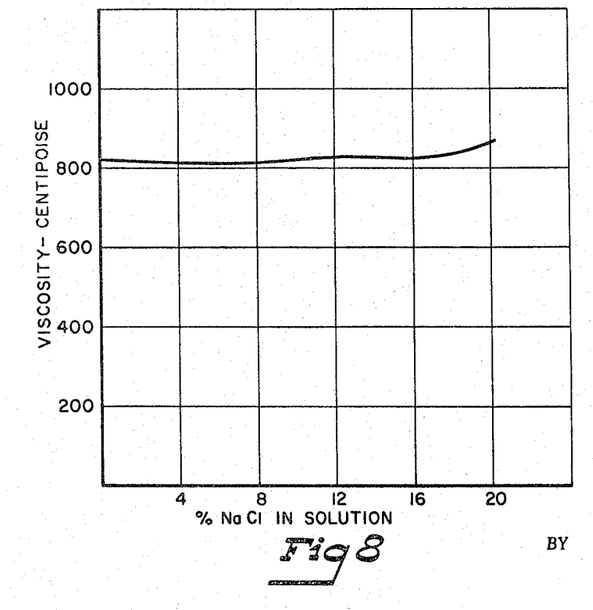
FIGURE 8 is a graph showing the viscosity of a scleroglucan gel as a function of NaCl concentration in the gel.

Scleroglucan gums are highly resistant to the effects of sodium chloride. FIG. 8, which is a plot of viscosity of a 0.5 percent scleroglucan gel at 25° C. as a function of a sodium chloride concentration in the gel, illustrates this resistance.

Similarly, ammonium sulfate has little effect on the final viscosity which may be obtained in a scleroglucan gel. The presence of ammonium sulfate, however, does produce a highly surprising result in that the rate of which viscosity increases with time is very low during the first two hours after scleroglucan is dispersed. Subsequent to this initial two-hour period, the viscosity of the gel increases very rapidly and attains a value very nearly as high as would be expected with water only.

When scleroglucan is subjected to hydrolysis by means of 1 N sulfuric acid at elevated temperatures (e.g. 100° C.), the compound yields a residue which consists solely of D-glucose. Thus, the polysaccharide consists of polymerized D-glucose residues.

When scleroglucan is subjected to periodate oxidation, a conventional analytical technique of carbohydrate chemistry which is more fully described by F. Smith and R. Montgomery, "The Chemistry of Plant Gums and Mucilages," Reinhold, (New York, 1959), pp. 144–222, one mole of formic acid is liberated for every four glucose units originally present in the compound. This indicates that only one-fourth of the glucose residues or units in the compound are cleaved by periodic acid and that this fraction is significantly different from the other three-fourths.

Moreover, when the residue from the periodate oxidation step is reduced by sodium borohydride and the resultant material is hydrolyzed with dilute sulfuric acid, one mole of glycerol is recovered for every four moles of glucose originally present in the polymer.

The residue from the last-mentioned hydrolysis is insoluble in water. Moreover, when this insoluble residue is subjected to enzymatic hydrolysis by the beta 1,3 D-glucanase which is derived from the organism Basidiomycete No. 806 of the collection maintained by the Microbiology Laboratory, Quartermaster Research and Engineering Center, Natick, Massachusetts, only D-glucose results. The fact that only D-glucose results from the action of beta 1,3 glucanase shows that the insoluble residue is a linear beta 1,3 D-glucan.

Scleroglucan is further characterized by its reaction to the previously mentioned beta 1,3 D-glucanase. This enzyme, which operates only from the end of a molecule, selectively cleaves beta 1,3 bonds only. When subjected to complete hydrolysis by this enzyme, scleroglucan breaks down into two equal weight fractions, one of which is D-glucose and the other of which is gentiobiose. In addition to facilitating the characterization of the structure of scleroglucan, this selective enzymatic degradation also provides a novel and highly advantageous method for preparing gentiobiose. The reaction mixture of gentiobiose and D-glucose may be separated by any convenient technique. One suitable technique is separating by charcoal Chromatography.

When the action of the beta 1,3 D-glucanase discussed above is controlled as to time and extent of degradation of the molecule, it has been found that the molecular ratio of gentiobiose to D-glucose resulting from the reaction remains constant with respect to time.

The above-described properties indicate that scleroglucan has the structure shown immediately below, that structure being a linear chain of beta 1,3 linked D-glucose units having a D-glucose unit appended thereto at every third main-chain glucose unit through a beta 1,6 linkage.

It cannot, of course, be determined at which glucose (i.e., unit 1, 2 or 3 in the above structure) in the chain the molecule starts or terminates. Probably, the product is a random mixture of molecules which start and end at different glucose units. In any event, one end of the molecule is always characterized by the presence of an aldehydic group.

Utilizing these aldehydic groups for analytical purposes, it has been ascertained that scleroglucan produced by *Sclerotium glucanium* has a molecular weight which ranges between approximately 19,000 and 25,000 (i.e., $n$ is approximately 30 to 38 in the structure above).

By means of controlled enzymatic degradation utilizing the beta 1,3 D-glucanase described above, the molecular weight of scleroglucan can be reduced to any convenient value. Control of the degradation is not diffiult because the enzymatic hydrolysis can be regulated to proceed quite slowly.

Since scleroglucan has three free hydroxyl groups (one primary and two secondary) on each main-chain glucose unit, and four free hydroxyl groups (one primary and three secondary) on each appended or side chain glucose unit, it is obvious that a number of chemical derivatives can be made. As will be more fully illustrated below, such derivatives as alkyl or aryl ethers and esters, xanthates, and carbanilates may be prepared. The term aero refers to substituted forms as well.

Thus, in its most generic form, the present invention encompasses the compounds having the general formula:

wherein Y is a member of the class consisting of OH, OR, OOCR, OCH$_2$COOH, OSO$_3$, ONO$_3$, OCS$_2$Na OOCNH$\phi$ where R is a member of the class consisting of lower alkyl or aryl.

Scleroglucan and its derivatives are useful for many purposes. In the crude form (i.e., the dehydrated fermentation liquor or the precipitated product with mycelium), the products are useful as additives in muds for oil-well drilling. In these forms, they are also useful as additives in the paper industry, either as part of a binder to impart greater strength or as coatings to provide a smoother, glossier surface to paper.

In more purified forms, scleroglucan and its derivatives are useful as gelling agents in the food industry, such uses being highly advantageous because of the lack of sensitivity of the products to changes in pH. In this connection, it should be noted that scleroglucan can also be cast into films which are useful in packaging foods, particularly in providing casings which come into direct contact with the food product. In the food field, the products may also be used as noncaloric food extenders.

Other nonfood uses include those of thickening water base paints and the coating of materials. As a coating, scleroglucan is advantageous in that it provides a film which is protective against the deleterious effects of air or other corrosive gas but is at the same time water soluble and therefore easily removable.

Organisms which produce a polysaccharide having a structure identical to that shown by scleroglucan above are *Sclerotium coffeicolum* Stahel, American Type Culture Collection No. 15208; *Sclerotium delphinii* Stevens, American Type Culture Collection No. 15196; *Sclerotium delphinii* Gilman, American Type Culture Collection No. 15197; *Sclerotium rolfsii* Gilman, American Type Culture Collection No. 15195; *Sclerotium rolfsii* Barnett, American Type Culture Collection No. 15201; *Sclerotium rolfsii* Barnett, American Type Culture Collection No. 15206; *Sclerotium rolfsii* Barnett, American Type Culture Collection No. 15203; *Sclerotium delphinii* Welch/White, American Type Culture Collection No. 15200; *Corticium rolfsii* (Sacc) Curzi, American Type Culture Collection No. 15212; *Corticium rolfsii* Curzi/Ficus, American Type Culture Collection No. 15209; *Sclerotium rolfsii* QM, American Type Culture Collection No. 15202; *Sclerotium rolfsii*, American Type Culture Collection No. 15204.

The remainder of the organisms, namely, *Sclerotium delphinii* Welch/Mix, American Type Culture Collection No. 15199; *Sclerotium delphinii* Stevens I, American Type Culture Collection No. 15194; *Sclerotium rolfsii* Barnett, American Type Culture Collection No. 15205; *Stromatinia narcissi* Groves, American Type Culture Collection No. 15213; *Sclerotinia gladoli* Drayton/Massey, American Type Culture Collection No. 15207; *Corticium rolfsii* (Sacc) Curzi, American Type Culture Collection No. 15210; *Corticium rolfsii* Curzi/Balducci, American Type Culture Collection No. 15211; and *Sclerotium delphinii* Jersveld/Welch, American Type Culture Collection No. 15198; produce polysaccharides which vary somewhat in structure from the structure indicated for scleroglucan. The polysaccharide produced by these organisms yields only D-glucose when subjected to hydrolysis by sulfuric acid as does scleroglucan. Upon periodate oxidation, about 28 percent mole formic acid is liberated, thus indicating that 2/7 of the glucose residues in the polysaccharide differ from the other 5/7, and as will be more fully pointed out below, constitute appendages from the main chain. The residue from the periodate oxidation of these polysaccharides yields approximately 28 mole percent glycerol and an insoluble second residue when subjected to reduction by sodium borohydride followed by hydrolysis with dilute sulfuric acid. The second residue yields only D-glucose from the action of glucanase which is derived from the organism Basidiomycete No. 806. Moreover, the original polysaccharide when subjected to the above-identified beta 1,3 D-glucanase yields a product containing glucose and gentiobiose in a 3:2 mole ratio, and the ratio of the yield of D-glucose and gentiobiose fractions is constant with respect to time throughout the enzymatic reaction.

The above characteristics clearly indicate that these polysacharrides are characterized by the following structure which contains a main chain of glucopyranose units linked through beta 1,3 to which glucopyranose units are linked beta 1,6, in the ratio of two appended units to five main chain units.

where the letter G refers to glucopyranose and linkages of either beta 1,6 or beta 1,3 are as indicated.

As in the case of scleroglucan, a number of chemical derivatives can be made, thus in a more generic structure for this class of polysaccharides has the following general formula:

where the letter G refers to glucopyranose and linkage of either beta 1,6 or beta 1,3 are as indicated, and $X_1$ and $X_2$ are selected from the group consisting of hydrogen and substituted glucopyranose having the structure:

and Y is a member of the class consisting of OH, OR, OOCR, $OCH_2COOH$, $OSO_3M$, $ONO_2$, $OCS_2M$, and $OOCNH\phi$, where R is a member of the class consisting of lower alkyl or aryl. M is any cation or hydrogen.

The tables which follow constitute a summary of experiments conducted with each of the organisms first mentioned above. In general, the tables list under fermentation results a number of carbohydrate sources which were tried for each organism but were by no means exhaustive, the initial pH of the culture, the final pH of the culture, the relative amount of growth of the organism during fermentation (estimated visually on a scale wherein +3 is maximum growth and 0 represents no growth), and the yield of polysaccharide in grams per liter for each carbohydrate source. Under chemical and physical results, a number of characteristics of each product are noted. The chemical and physical results were all derived from the material produced from dextrose.

*Sclerotium coffeicolum* Stahel

PILLSBURY CULTURE CODE: NO. 7, AMERICAN TYPE CULTURE, COLLECTION NO. 15208
[Source: Centraalbureau Voor Schimmelcultures, Baarn, Netherlands]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 1.9 | +3 | 1.78 |
| Sucrose | 4.5 | 2.6 | +3 | 0.46 |
| Fructose | 4.5 | 1.9 | +3 | 2.08 |
| Maltose | 4.5 | 2.1 | +3 | 1.55 |
| Starch | 4.5 | 2.1 | +2 | 0.49 |
| Arabinose | 4.5 | 3.0 | +2 | 0.01 |
| Galactose | 4.5 | 2.5 | +2 | 0.20 |
| Glycerol | 4.5 | 3.2 | +1 | Floc. |
| Lactose | 4.5 | 2.5 | +3 | 1.22 |
| Mannose | 4.5 | 2.0 | +3 | 2.06 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
  Specific rotation $[\alpha]_D$ 0° (1N NaOH).
  Products from polymer acid hydroylsis: Glucose.
  Mole percent formic acid derived from periodate oxidation: 24.
  Hydrolysis product of periodate oxidized gum: Glycerol.
  Degree of polymerization: 600–800 glucopyranose units.
  Enzymatic hydrolysis products by β1-3 glucanase: 2:1 moles glucose gentiobiose.

*Sclerotium delphinii* Stevens

PILLSBURY CULTURE CODE: NO. 8, AMERICAN TYPE CULTURE, COLLECTION NO. 15196
[Source: Centraalbureau Voor Schimmelcultures, Baarn, Netherlands]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 2.7 | +3 | 1.47 |
| Sucrose | 4.5 | 2.4 | +3 | 0.66 |
| Fructose | 4.5 | 2.7 | +3 | 1.62 |
| Maltose | 4.5 | 2.8 | +3 | 0.29 |
| Starch | 4.5 | 2.6 | +3 | 0.45 |
| Arabinose | 4.5 | 2.8 | +3 | 0.08 |
| Mannose | 4.5 | 2.7 | +3 | 1.30 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
  Specific rotation $[\alpha]_D$ +1.7° (1N NaOH).
  Products from polymer acid hydrolysis: Glucose.
  Mole percent formic acid derived from periodate oxidation: 23.
  Hydrolysis product of periodate gum: Glycerol.
  Degree of polymerization: 480 glucopyranose units.
  Enzymatic hydrolysis products by β1-3 glucanase: 2:1 moles glucose gentiobiose.

*Sclerotium delphinii* Welch/Mix

PILLSBURY CULTURE CODE: NO. 9, AMERICAN TYPE CULTURE, COLLECTION NO. 15199
[Source: Centraalbureau Voor Schimmelcultures, Baarn, Netherlands]

| Carbohydrate (2%*) | Fermentation Results | | | |
|---|---|---|---|---|
| | Initial pH | Final pH | Relative Amount Growth | Yield Polymer, g./l. |
| Dexrrose | 4.5 | 2.4 | +3 | 1.66 |
| Sucrose | 4.5 | 2.3 | +3 | 1.04 |
| Fructose | 4.5 | 2.2 | +3 | 1.15 |
| Maltose | 4.5 | 2.5 | +3 | 1.02 |
| Starch | 4.5 | 2.4 | +1 | 0.68 |
| Arabinose | 4.5 | 2.5 | +3 | 0.52 |
| Galactose | 4.5 | 2.7 | +1 | Floc. |
| Glycerol | 4.5 | 2.5 | +1 | Floc. |
| Lactose | 4.5 | 2.5 | +1 | 0.48 |
| Mannose | 4.5 | 2.7 | +3 | 3.57 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
  Specific rotation $[\alpha]_D$ +6.6° (1N NaOH).
  Products from polymer acid hydrolysis: Glucose.
  Mole percent formic acid derived from periodate oxidation: 28:5.
  Hydrolysis product of periodate oxidized gum: Glycerol.
  Degree of polymerization: 730 glucopyranose units.
  Enzymatic hydrolysis products by β1-3 glucanase: 3:2 moles glucose gentiobiose.

Sclerotium delphinii Stevens I

PILLSBURY CULTURE CODE: NO. 19, AMERICAN TYPE CULTURE, COLLECTION NO. 15194
[Source: Centraalbureau Voor Schimmelcultures, Baarn, Netherlands]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 3.0 | +3 | 1.34 |
| Sucrose | 4.5 | 3.4 | +3 | 1.26 |
| Fructose | 4.5 | 3.5 | +3 | 0.66 |
| Maltose | 4.5 | 3.6 | +3 | 0.39 |
| Starch | 4.5 | 3.0 | +3 | 0.26 |
| Arabinose | 4.5 | 3.4 | +2 | 0.10 |
| Galactose | 4.5 | 3.7 | +3 | Floc. |
| Lactose | 4.5 | 3.0 | +1 | 0.04 |
| Mannose | 4.5 | 3.4 | +3 | 1.71 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
  Specific rotation $[\alpha]_D$ +2.3° (1N NaOH).
  Products from polymer acid hydrolysis: glucose.
  Mole percent formic acid derived from periodate oxidation: 21.
  Hydrolysis product of periodate oxidized gum: Glycerol.
  Degree of polymerization: 200 glucopyranose units.
  Enzymatic hydrolysis products by β1-3 glucanase: 3:2 moles glucose gentiobiose.

Sclerotium delphinii Gilman

PILLSBURY CULTURE CODE: NO. 23, AMERICAN TYPE CULTURE, COLLECTION NO. 15197
[Source: Dr. Joseph Gilman, Iowa State University, Ames, Iowa]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 3.5 | +3 | 5.42 |
| Sucrose | 4.5 | 3.6 | +3 | 4.52 |
| Fructose | 4.5 | 2.9 | +3 | 5.02 |
| Maltose | 4.5 | 3.1 | +3 | 4.42 |
| Starch | 4.5 | 2.5 | +3 | 3.24 |
| Arabinose | 4.5 | 2.6 | +2 | 0.90 |
| Galactose | 4.5 | 2.5 | +2 | 1.42 |
| Glycerol | 4.5 | 3.0 | +1 | Floc. |
| Lactose | 4.5 | 2.6 | +2 | 1.59 |
| Mannose | 4.5 | 3.5 | +3 | 5.07 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
  Specific rotation $[\alpha]_D$+1.9° (1N NaOH).
  Products from polymer acid hydrolysis: Glucose.
  Mole percent formic acid derived from periodate oxidation: 25.
  Hydrolysis product of periodate oxidized gum: Glycerol.
  Degree of polymerization: 200 glucopyranose units.
  Enzymatic hydrolysis products by β-3 glucanase: 2:1 moles glucose gentiobiose.

Sclerotium rolfsii Gilman

PILLSBURY CULTURE CODE: NO. 24, AMERICAN TYPE CULTURE, COLLECTION NO. 15195
[Source: Dr. Joseph Gilman, Iowa State University, Ames, Iowa]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 2.6 | +3 | 4.80 |
| Sucrose | 4.5 | 2.5 | +3 | 3.87 |
| Fructose | 4.5 | 2.3 | +3 | 5.04 |
| Maltose | 4.5 | 2.5 | +3 | 4.50 |
| Starch | 4.5 | 2.3 | +3 | 2.43 |
| Arabinose | 4.5 | 2.7 | +1 | 0.54 |
| Galactose | 4.5 | 2.3 | +1 | 0.56 |
| Glycerol | 4.5 | 2.9 | +1 | 0.08 |
| Lactose | 4.5 | 2.6 | +1 | 0.44 |
| Mannose | 4.5 | 2.3 | +3 | 3.40 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
  Specific rotation $[\alpha]_D$+2.5° (1N NaOH).
  Products from polymer acid hydrolysis: Glucose.
  Mole percent formic acid derived from periodate oxidation: 27.5.
  Hydrolysis product of periodate oxidized gum: Glycerol.
  Degree of polymerization: 180–340 glucopyranose units.
  Enzymatic hydrolysis products by β1-3 glucanase: 2:1 mols glucose gentiobiose.

Sclerotium rolfsii Barnett

PILLSBURY CULTURE CODE: NO. 26, AMERICAN TYPE CULTURE, COLLECTION NO. 15205
[Source: Dr. Dr. H. Barnett, University of West Virginia, Morgantown, West Virginia]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 3.0 | +3 | 5.35 |
| Sucrose | 4.5 | 3.0 | +3 | 4.99 |
| Fructose | 4.5 | 2.9 | +3 | 4.02 |
| Maltose | 4.5 | 3.6 | +3 | 4.89 |
| Starch | 4.5 | 3.0 | +3 | 2.89 |
| Arabinose | 4.5 | 3.0 | +2 | 0.44 |
| Galactose | 4.5 | 2.5 | +2 | 0.76 |
| Glycerol | 4.5 | 3.0 | +1 | 0.20 |
| Lactose | 4.5 | 2.7 | +1 | 0.16 |
| Mannose | 4.5 | 2.8 | +3 | 4.60 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical results:
  Specific rotation $[\alpha]_D$+3.8° (1N NaOH).
  Products from polymer acid hydrolysis: Glucose.
  Mole percent formic acid derived from periodate oxidation: 25.5.
  Hydrolysis product of periodate oxidized gum: Glycerol.
  Degree of polymerization: 1,190 glucopyranose units.
  Enzymatic hydrolysis products by β1-3 glucanase: 3:2 moles glucose gentiobiose.

Sclerotium rolfsii Barnett

PILLSBURY CULTURE CODE: NO. 27, AMERICAN TYPE CULTURE, COLLECTION NO. 15201

[Source: Dr. H. Barnett, University of West Virginia, Morgantown, West Virginia]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 3.3 | +3 | 3.85 |
| Sucrose | 4.5 | 3.5 | +3 | 5.04 |
| Fructose | 4.5 | 3.3 | +3 | 3.65 |
| Maltose | 4.5 | 3.6 | +3 | 5.46 |
| Starch | 4.5 | 3.4 | +3 | 3.70 |
| Arabinose | 4.5 | 3.8 | +3 | 0.87 |
| Galactose | 4.5 | 3.2 | +3 | 1.06 |
| Glycerol | 4.5 | 3.0 | +1 | 0.01 |
| Lactose | 4.5 | 2.9 | +1 | 0.20 |
| Mannose | 4.5 | 3.0 | +3 | 3.34 |
| None | 4.5 | 3.6 | 0 | 0.01 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
  Specific rotation $[\alpha]_D$ 0° (1N NaOH)
  Products from polymer acid hydrolysis: Glucose
  Mole percent formic acid derived from periodate oxidation: 25.
  Hydolysis product of periodate oxidized gum: Glycerol.
  Degree of polymerization: 1480 glucopyranose units.
  Enzymatic hydrolysis products by β1-3 glucanase: 2:1 moles glucose gentiobiose.

Sclerotium rolfsii Barnett

PILLSBURY CULTURE CODE: NO. 32, AMERICAN TYPE CULTURE, COLLECTION NO. 15203

[Source: Dr. H. Barnett, University of West Virginia, Morgantown, West Virginia]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 3.0 | +3 | 4.12 |
| Sucrose | 4.5 | 2.8 | +3 | 3.04 |
| Fructose | 4.5 | 3.0 | +3 | 3.77 |
| Maltose | 4.5 | 3.4 | +3 | 1.34 |
| Starch | 4.5 | 2.8 | +2 | 2.84 |
| Arabinose | 4.5 | 3.4 | +3 | 0.36 |
| Galactose | 4.5 | 2.8 | +3 | 1.07 |
| Glycerol | 4.5 | 2.8 | +1 | Floc. |
| Lactose | 4.5 | 2.5 | +2 | 0.64 |
| Mannose | 4.5 | 3.0 | +3 | 2.22 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
  Specific rotation $[\alpha]_D$ +0.9° (1 N NaOH).
  Products from polymer acid hydrolysis: Glucose.
  Mole percent formic acid derived from periodate oxidation: 25.
  Hydrolysis product of periodate oxidized gum: Glycerol.
  Degree of polymerization: 1,160 glucopyranose units.
  Enzymatic hydrolysis products by β1-3 glucanase: 2:1 moles glucose gentiobiose.

Sclerotium rolfsii Barnett

PILLSBURY CULTURE CODE: NO. 31, AMERICAN TYPE CULTURE, COLLECTION NO. 15206

[Source: Dr. H. Barnett, University of West Virginia, Morgantown, West Virginia]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 3.5 | +3 | 3.55 |
| Sucrose | 4.5 | 3.4 | +3 | 4.35 |
| Fructose | 4.5 | 3.4 | +3 | 4.06 |
| Maltose | 4.5 | 3.8 | +3 | 6.20 |
| Starch | 4.5 | 3.9 | +3 | 3.31 |
| Arabinose | 4.5 | 3.9 | +3 | 0.54 |
| Galactose | 4.5 | 3.5 | +3 | 1.24 |
| Glycerol | 4.5 | 3.0 | 0 | 0.02 |
| Lactose | 4.5 | 2.9 | +1 | 0.36 |
| Mannose | 4.5 | 3.4 | +3 | 3.42 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
  Specific rotation $[\alpha]_D$ +4.4 (1N NaOH).
  Products from polymer acid hydrolysis: (Glucose.
  Mole percent formic acid derived from periodate oxidation: 26.5.
  Hydrolysis product of periodate oxidized gum: Glycerol.
  Average degree of polymerization: 750 glucopyranose units.
  Enzymatic hydrolysis products by β1-3 glucanase: 2:1 moles gluco gentiobiose.

Stromatinia narcissi Groves

PILLSBURY CULTURE CODE: NO. 44, AMERICAN TYPE CULTURE, COLLECTION NO. 15213

[Source: Centraalbureau Voor Schimmelcultures, Baarn, Netherlands]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 3.2 | +3 | 0.92 |
| Sucrose | 4.5 | 3.3 | +3 | 2.07 |
| Fructose | 4.5 | 3.6 | +3 | 1.34 |
| Maltose | 4.5 | 3.0 | +3 | 0.70 |
| Starch | 4.5 | 4.8 | +3 | 0.10 |
| Arabinose | 4.5 | 5.1 | +3 | 1.06 |
| Galactose | 4.5 | 4.8 | +3 | 1.62 |
| Glycerol | 4.5 | 5.5 | +1 | 0.06 |
| Lactose | 4.5 | 5.6 | +3 | Floc. |
| Mannose | 4.5 | 3.5 | +3 | 1.00 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
  Specific rotation $[\alpha]_D$ −3.8° (1 N NaOH).
  Products from polymer acid hydrolysis: Glucose.
  Mole percent formic acid derived from periodate oxidation: 29.5.
  Hydrolysis product of periodate oxidized gum: Glycerol.
  Degree of polymerization: 1,570 glucopyranose units.
  Enzymatic hydrolysis products by β1-3 glucanase: 3:2 moles glucose gentiobiose.

*Sclerotinia gladoli* Drayton/Massey

PILLSBURY CULTURE CODE: NO. 45, AMERICAN TYPE CULTURE, COLLECTION NO. 15207

[Source: Centraalbureau Voor Schimmelcultures, Baarn, Netherlands]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 3.8 | +3 | 2.12 |
| Sucrose | 4.5 | 3.6 | +3 | 2.47 |
| Fructose | 4.5 | 4.8 | +3 | 2.48 |
| Maltose | 4.5 | 3.3 | +3 | 1.50 |
| Starch | 4.5 | 4.8 | +3 | 1.31 |
| Arabinose | 4.5 | 5.0 | +3 | 1.26 |
| Galactose | 4.5 | 4.7 | +3 | 1.36 |
| Lactose | 4.5 | 5.1 | +2 | 0.82 |
| Mannose | 4.5 | 4.6 | +3 | 2.48 |

*Other medium ingredients: 0.1% bbl. Yeast Extract; 0.15% MgSO₄ 0.1% KH₂PO₄; 0.2% NaNO₃; 28° C., 200 r.p.m., 2% inoculum from 1.5% dextrose broth.

Chemical and physical results:
 Specific rotation $[\alpha]_D +2.7°$ (1 N NaOH).
 Products from polymer acid hydrolysis: Glucose.
 Mole percent formic acid derived from periodate oxidation: 28.
 Hydrolysis product of periodate oxidized gum: Glycerol.
 Degree of polymerization: 940 glucopyranose units.
 Enzymatic hydrolysis products by β1-3 glucanase: 3:2 moles glucose gentiobiose.

*Sclerotium delphinii* Welch/White

PILLSBURY CULTURE CODE: NO. 46, AMERICAN TYPE CULTURE, COLLECTION NO. 15200

[Source: Centraalbureau Voor Schimmelcultures, Baarn, Netherlands]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 3.2 | +3 | 3.20 |
| Sucrose | 4.5 | 3.0 | +3 | 2.20 |
| Fructose | 4.5 | 3.0 | +3 | 2.64 |
| Maltose | 4.5 | 2.8 | +3 | 1.94 |
| Starch | 4.5 | 2.8 | +2 | 0.57 |
| Arabinose | 4.5 | 2.7 | +2 | 1.36 |
| Galactose | 4.5 | 2.7 | +3 | 0.63 |
| Lactose | 4.5 | 2.6 | +2 | 0.06 |
| Mannose | 4.5 | 3.1 | +3 | 2.72 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
 Specific rotation $[\alpha]_D -2.9°$ (1 N NaOH).
 Products from polymer acid hydrolysis: Glucose.
 Mole percent formic acid derived from periodate oxidation: 28.
 Hydrolysis product of periodate oxidized gum: Glycerol.
 Degree of polymerization: 375 glucopyranose units.
 Enzymatic hydrolysis products by β1-3 glucanase: 2:1 moles glucose gentiobiose.

*Corticium rolfsii* (Sacc) Curzi

PILLSBURY CULTURE CODE: NO. 50, AMERICAN TYPE CULTURE, COLLECTION NO. 15212

[Source: Centraalbureau Voor Schimmelcultures, Baarns, Netherlands]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 3.0 | +3 | 2.02 |
| Sucrose | 4.5 | 3.4 | +3 | 2.94 |
| Fructose | 4.5 | 3.3 | +3 | 1.37 |
| Maltose | 4.5 | 3.5 | +3 | 2.06 |
| Starch | 4.5 | 3.2 | +1 | 0.12 |
| Arabinose | 4.5 | 3.8 | +2 | Floc. |
| Galactose | 4.5 | 2.9 | +1 | 0.10 |
| Glycerol | 4.5 | 2.9 | +1 | 0.06 |
| Lactose | 4.5 | 3.2 | +2 | 0.94 |
| Mannose | 4.5 | 3.5 | +3 | 2.44 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
 Specific rotation $[\alpha]_D +2.4°$ (1N NaOH).
 Products from polymer acid hydrolysis: Glucose.
 Mole percent formic acid derived from periodate oxidation: 26.5.
 Hydrolysis product of periodate oxidized gum: Glycerol.
 Degree of polymerization: 1,280 glucopyranose units.
 Enzymatic hydrolysis products by β1-3 glucanase: 2:1 moles glucose gentiobiose.

*Corticium rolfsii* (Sacc) Curzi

PILLSBURY CULTURE CODE: NO. 51, AMERICAN TYPE CULTURE, COLLECTION NO. 15210

[Source: Centraalbureau Voor Schimmelcultures, Baarns, Netherlands]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 3.6 | +3 | 2.52 |
| Sucrose | 4.5 | 3.5 | +3 | 2.54 |
| Fructose | 4.5 | 3.5 | +3 | 2.66 |
| Maltose | 4.5 | 3.5 | +3 | 2.34 |
| Starch | 4.5 | 3.0 | +2 | 0.78 |
| Arabinose | 4.5 | 3.7 | +3 | 0.50 |
| Galactose | 4.5 | 3.6 | +3 | 0.88 |
| Glycerol | 4.5 | 3.0 | +1 | 0.02 |
| Lactose | 4.5 | 3.1 | +3 | 1.72 |
| Mannose | 4.5 | 3.7 | +3 | 3.10 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
 Specific rotation $[\alpha]_D +1.4°$ (1N NaOH).
 Products from polymer acid hydrolysis: Glucose.
 Mole percent formic acid derived from periodate oxidation: 26.
 Hydrolysis product of periodate oxidized gum: Glycerol.
 Degree of polymerization: 1,500 glucopyranose units.
 Enzymatic hydrolysis products by β1-3 glucanase: 3:2 moles glucose gentiobiose.

Corticium rolfsii Curzi/Balducci

PILLSBURY CULTURE CODE: NO. 52, AMERICAN TYPE CULTURE, COLLECTION NO. 15211

[Source: Centraalbureau Voor Schimmelcultures, Baarn, Netherlands]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 2.4 | +3 | 0.91 |
| Sucrose | 4.5 | 2.2 | +3 | 0.54 |
| Fructose | 4.5 | 2.9 | +3 | 1.86 |
| Maltose | 4.5 | 2.3 | +3 | 2.02 |
| Starch | 4.5 | 2.1 | +2 | 1.06 |
| Arabinose | 4.5 | 2.5 | +2 | 0.26 |
| Galactose | 4.5 | 2.3 | +1 | 0.04 |
| Mannose | 4.5 | 2.6 | +3 | 1.46 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
Specific rotation $[\alpha]_D +1.8°$ (1N NaOH).
Products from polymer acid hydrolysis: Glucose.
Mole percent formic acid derived from periodate oxidation: 25.5.
Hydrolysis product of periodate oxidized gum: Glycerol.
Degree of polymerization: 930 glucopyranose units.
Enzymatic hydrolysis products by β1–3 glucanase: 3:2 moles glucose gentiobiose.

Sclerotium delphinii Jersveld/Welch

PILLSBURY CULTURE CODE: NO. 53, AMERICAN TYPE CULTURE, COLLECTION NO. 15198

[Source: Centraalbureau Voor Schimmelcultures, Baarn, Netherlands]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 3.2 | +3 | 1.25 |
| Sucrose | 4.5 | 2.3 | +3 | 3.31 |
| Fructose | 4.5 | 2.9 | +3 | Floc. |
| Maltose | 4.5 | 2.2 | +3 | 1.88 |
| Starch | 4.5 | 2.5 | +3 | 0.64 |
| Arabinose | 4.5 | 3.0 | +3 | 0.80 |
| Galactose | 4.5 | 3.0 | +3 | 0.46 |
| Lactose | 4.5 | 2.4 | +1 | 0.52 |
| Mannose | 4.5 | 3.2 | +3 | Floc. |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
Specific rotation $[\alpha]_D +1.8°$ (1N NaOH).
Products from polymer acid hydrolysis: Glucose.
Mole percent formic acid derived from periodate oxidation: 25.5.
Hydrolysis product of periodate oxidized gum: Glycerol.
Degree of polymerization: 770 glucopyranose units.
Enzymatic hydrolysis products by β1–3 glucanase: 3:2 moles glucose gentiobiose.

Corticium rolfsii Curzi/Ficus

PILLSBURY CULTURE CODE: NO. 57, AMERICAN TYPE CULTURE, COLLECTION NO. 15209

[Source: Centraalbureau Voor Schimmelcultures, Baarn, Netherlands]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 3.2 | +3 | 4.13 |
| Sucrose | 4.5 | 3.6 | +3 | 2.42 |
| Fructose | 4.5 | 3.6 | +3 | 1.86 |
| Maltose | 4.5 | 3.9 | +3 | 2.56 |
| Starch | 4.5 | 2.5 | +2 | 2.52 |
| Arabinose | 4.5 | 3.3 | +1 | 0.44 |
| Galactose | 4.5 | 2.8 | +2 | 0.60 |
| Glycerol | 4.5 | 3.0 | +2 | Floc. |
| Lactose | 4.5 | 2.8 | +2 | 0.70 |
| Mannose | 4.5 | 3.2 | +3 | 4.02 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
Specific rotation $[\alpha]_D +2.1°$ (1N NaOH).
Products from polymer acid hydrolysis: Glucose.
Mole percent formic acid derived from periodate oxidation: 25.
Hydrolysis product of periodate oxidized gum: Glycerol.
Degree of polymerization: 715 glucopyranose units.
Enzymatic hydrolysis products by β1–3 glucanase: 2·1 moles glucose gentiobiose.

Sclerotium rolfsii QM

PILLSBURY CULTURE CODE: NO. 78, AMERICAN TYPE CULTURE, COLLECTION NO. 15202

[Source: Quartermaster Food and Container Institute, U.S. Army, Natick, Massachusetts]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 3.8 | +3 | 2.35 |
| Sucrose | 4.5 | 3.7 | +3 | 2.44 |
| Fructose | 4.5 | 3.8 | +3 | 3.04 |
| Maltose | 4.5 | 3.7 | +3 | 2.40 |
| Starch | 4.5 | 3.2 | +3 | 1.95 |
| Arabinose | 4.5 | 3.5 | +2 | 0.24 |
| Galactose | 4.5 | 3.4 | +3 | 0.50 |
| Glycerol | 4.5 | 3.1 | +1 | Floc. |
| Lactose | 4.5 | 3.5 | +3 | 1.12 |
| Mannose | 4.5 | 3.9 | +3 | 3.60 |

*Other medium ingredients: 0.1% bbl. Yeast Extract; 0.15% MgSO₄; 0.1% KH₂PO₄; 0.2% NaNO₃; 28° C., 200 r.p.m., 2% inoculum from 1.5% dextrose broth.

Chemical and physical results:
Specific rotation $[\alpha]_D -1.3°$ (1N NaOH).
Products from polymer acid hydrolysis: Glucose.
Mole percent formic acid derived from periodate oxidation: 26.
Hydrolysis product of periodate oxidized gum: Glycerol.
Degree of polymerization: 480+ glucopyranose units.
Enzymatic hydrolysis products by β1–3 glucanase: 2:1 moles glucose gentiobiose.

*Sclerotium rolfsii* QM

PILLSBURY CULTURE CODE: NO. 79, AMERICAN TYPE CULTURE, COLLECTION NO. 15204
[Source: Quartermaster Food and Container Institute, U.S. Army, Natick, Massachusetts]

| Carbohydrate (2%*) | Fermentation Results | | | |
|---|---|---|---|---|
| | Initial pH | Final pH | Relative Amount Growth | Yield Polymer, g./l. |
| Dextrose | 4.5 | 2.6 | +3 | 0.96 |
| Sucrose | 4.5 | 2.5 | +3 | 0.81 |
| Fructose | 4.5 | 2.7 | +3 | 2.08 |
| Maltose | 4.5 | 2.9 | +3 | 0.40 |
| Starch | 4.5 | 2.9 | +2 | 1.01 |
| Arabinose | 4.5 | 2.8 | +2 | 0.49 |
| Galactose | 4.5 | 2.4 | +2 | 0.25 |
| Glycerol | 4.5 | 2.8 | +1 | Floc. |
| Lactose | 4.5 | 2.5 | +2 | 0.37 |
| Mannose | 4.5 | 2.8 | +3 | 3.66 |

*Other medium ingredients: 0.1% bbl. Yeast Extract; 0.15% MgSO$_4$; 0.1% KH$_2$PO$_4$; 0.2% NaNO$_3$; 28° C., 200 r.p.m., 2% inoculum from 1.5% dextrose broth.

Chemical and physical results:
  Specific rotation $[\alpha]_D$ +1.9 (1N NaOH).
  Products from polymer acid hydrolysis: Glucose.
  Mole percent formic derived from periodate oxidation: 26.
  Hydrolysis product of periodate oxidized gum: Glycerol.
  Degree of polymerization: 790 glucopyranose units.
  Enzymatic hydrolysis products by β1-3 glucanase: 2:1 moles glucose gentiobiose.

To illustrate the invention in even greater detail, the following illustrative examples, all of which relate to scleroglucan but which are obviously applicable to polysaccharides of the invention generally, are offered:

EXAMPLE I

A sterile culture medium consisting of:
  300 ml. distilled water
  9 g. sucrose
  0.9 g. NaNO$_3$
  0.3 g. K$_2$HPO$_4$
  0.15 g. MgSO$_4$
  0.15 g. KCl
  0.3 g. autolyzed yeast
  0.003 g. FeSO$_4$ was inoculated with a loopful of *Sclerotium glucanicum* n. sp. (NRRL 3006) and incubated for 3 days at approximately 28° C. on a rotary shaker. The resultant culture was placed in a sterile blender, homogenized and set aside for use as an inoculum.

A larger culture medium was prepared in a fermenter vessel having a capacity of 14 liters using:
  10 liters distilled water
  300 g. sucrose
  30 g. NaNO$_3$
  10 g. K$_2$HPO$_4$
  5 g. MgSO$_4$
  .5 g. KCl
  10 g. autolyzed yeast
  0.5 g. FeSO$_4$ The pH of the resulting medium was adjusted to 4.5 with hydrochloric acid and then autoclaved for one hour at 15 p.s.i. steam pressure (250° F.).

After the culture medium had cooled, the previously prepared, homogenized 300 ml. inoculum was added to the fermenter vessel, which vessel was then placed in a laboratory fermenter equipped with variable speed agitation, a sterile air supply, and temperature control provided by a constant temperature water bath. The medium was incubated for five days in the fermenter at a temperature of 28° C. an agitation rate of 200 r.p.m., and an aeration rate of 1000 cc./min. The fermentate was then removed and placed in a 30 liter vessel to which 10 liters of water were added. After thorough mixing, the diluted fermentate was heated to approximately 90 to 95° C. cooled, and then filtered through six layers of cotton gauze for removal of mold cells.

To the filtrate, six liters of methyl alcohol were added. Within a few minutes, the product rose to the surface as a flock and was removed therefrom by skimming. The material was washed twice with methyl alcohol and then dried in an oven at 50° C. The fibrous matt of material which resulted was comminuted to a fine powder and weighed. 82 g. of product was recovered an analysis showed the product to have the chemical structure shown in FIG. 10.

EXAMPLE II

A sample of the product resulting from the fermentation procedure described in Example I was placed into a solution in water at a concentration of 1 percent. To this solution, the beta 1,3 D-glucanase derived from the organism Basidiomycete No. 806 of the collection maintained by the Microbiology Laboratory, Quartermaster Research & Engineering Center, Natick, Massachusetts, was added and the resulting mixture maintained at 37° C.

As the sample was slowly degraded in molecular weight over the next 12 hours, samples were removed at intervals of 2 hours and analyzed. Approximately equal parts by weight of gentiobiose and D-glucose were recovered throughout the degradation.

EXAMPLE III

The dry ingredients of a standard chiffon cake formulation, containing gum arabic as an additive for improved texture and keeping quantities, were modified by using scleroglucan in place of gum arabic. The standard and modified cakes were baked in the same oven and compared for quality. The cake having scleroglucan exhibited a greater height and significantly better keeping qualities than the standard formulation in which gum arabic was present.

EXAMPLE IV

A standard marshmallow-like cake frosting formulation was modified by adding 0.4 weight per cent (dry basis) of scleroglucan. The resulting frosting exhibited a more attractive appearance and retained moisture to a greater extent over a 24 hour test than did the standard formulation. In addition, the frosting containing scleroglucan did not form a skin upon exposure to air whereas the standard formulation formed a skin within several hours.

EXAMPLE V

A solution containing 0.25 percent by weight of a product of Example I was filtered through filter paper supported in a Buchner funnel. A smooth, glossy coating formed on the upper side of the filter paper. This coating provided a substantial increase in rigidity but was at the same time flexible and did not crack. It also provided a durable surface suitable for printing or writing.

EXAMPLE VI

A 1 percent solution of the product of Example I was applied as a coating of uniform thickness upon a highly polished flat metal sheet and allowed to dry in air. A film formed on the sheet and was peeled off when completely dried. The film which resulted was transparent, strong, flexible, slowly soluble in water, and appeared to be impervious to nondegrading gases.

EXAMPLE VII

A 50 gram sample of scleroglucan prepared as in Example I is dissolved in 50 ml. of a 10 percent NaOH solution. To this solution 10 ml. CS$_2$ are added and the mixture is poured into 500 ml. of water. The xanthate derivative is recovered as a fibrous precipitate by adding methyl alcohol and filtering.

EXAMPLE VIII

A solution of 75 g. of scleroglucan in 100 ml. distilled water is added to 300 ml. of methyl sulfate. 50 ml. of a 30 percent NaOH solution is added to the aforementioned mixture with vigorous stirring while maintaining the mixture at a temperature of approximately 5° C. Nineteen additional 50 ml. aliquots of the NaOH solution are added at such intervals as to maintain only a slight excess of NaOH at all times. The reaction mixture is stirred for several hours and then neutralized with dilute sulfuric acid. The resultant solution is dialyzed overnight to remove inorganic salts. Water is removed by vacuum distillation and the methylated compound recovered.

EXAMPLE IX

Three grams of scleroglucan prepared as in Example I are dissolved in 20 ml. of distilled water and then heated to 80° C. and cooled. Twenty grams of a 50 weight per cent NaOH solution are slowly added with cooling, after which 18 grams of monochloroacetic acid are added in the cold. The reaction mixture is maintained at room temperature for approximately one day after which the mixture is neutralized with glacial acetic acid and dialyzed. The resultant solution is evaporated in vacuo to a final volume of 45 ml. 0.5 ml. of saturated NaCl solution is added after which ethanol is added until a precipitate forms. The precipitate which is recovered is sodium carboxymethyl scleroglucan.

EXAMPLE X

Three grams of scleroglucan prepared as in Example I are dissolved in 90 grams of a 20 percent NaOH solution. 117 grams of benzyl chloride are added and the resultant mixture heated under reflux at 80-85° C. for four hours. The mixture is cooled and maintained at room temperature with stirring for 17 hours. After removal of the excess benzyl chloride by steam distillation, the benzyl derivative of scleroglucan is separated by means of centrifugation. The product is purified by washing with hot water and further purification may be accomplished, if desired, by dissolving the product in glacial acetic acid followed by reprecipitation and additional washing with ethyl ether.

EXAMPLE XI

A 3 gram sample of scleroglucan prepared as in Example I is wet with ethyl ether and then heated with 33 ml. of pyridine at 60° C. for ten minutes. The mixture is cooled and treated with 10 ml. of acetic anhydride. After being maintained for approximately two days at room temperature, a precipitate appears. The mixture is then poured into water and the product appears as a precipitate therein. Recovery of the scleroglucan acetate is accomplished by filtration.

EXAMPLE XII

A 3 gram sample of scleroglucan prepared as in Example I dispersed in 33 ml. of pyridine, heated to 60° C., and maintained at that temperature for ten minutes. 15 grams of benzoyl chloride are added with cooling and a precipitate is formed. The reaction is maintained at room temperature for eight days with occasional stirring each day. It is then poured into water from which the product, scleroglucan benzoate, is recovered as a precipitate.

EXAMPLE XIII

Four ml. of chlorosulphonic are added to 40 ml. pyridine cooled in an ice bath. The mixture was heated to 65° C. 5 grams of finely powdered and dried scleroglucan prepared as in Example I are then added and the mixture maintained at 65–70° C. for 30 minutes with frequent stirring. After being cooled, the solution is added to 300 ml. of water, precipitated with 1000 ml. of ethanol, and the precipitate separated by centrifugation. The product is then redissolved in 150 ml. of water, neutralized with NaOH, and then reprecipitated with 400 ml. of ethanol. This product is redissolved in water, dialyzed to remove excess sulfate, and reprecipitated with ethanol. A final wash with ethanol and ether yields purified scleroglucan sulfate.

EXAMPLE XIV

A 2½ gram sample of dry scleroglucan is heated with 40 ml. pyridine and phenyl isocyanate at 100° C. for 7½ hours with occasional stirring. After being set aside overnight at room temperature, the liquid is poured into 200 ml. of ethanol. To this mixture, 200 ml. of water are added and the scleroglucan carbanilate appears as a colloid, which is coagulated with 6 ml. of a saturated NaCl solution. The resulting precipitate of the product is centrifuged and washed with water.

It should be apparent that the above examples are merely illustrative of the invention and are not to be interpreted in a limiting sense. The invention should, rather, be limited only by the appended claims.

What is claimed is:

1. A water soluble polysaccharide having the characteristics of a thickening agent in water and derivatives thereof characterized by the struture:

wherein Y is a member of the class consisting of OH, OR, OOCR, OCH$_2$COOH, OSO$_3$H, ONO$_2$, OCS$_2$H, and OOCNH$\phi$, where R is a member of the class consisting of lower alkyl and phenyl and $n$ is an integer having a value of at least 30.

2. The polymer of claim 1 wherein Y is OH.

3. A substantially water soluble polysaccharide composed of an average of at least about 120 D-glucopyranose units and having the characteristics of:
 (a) yielding only D-glucose when subjected to hydrolysis by 1 N sulfuric acid at approximately 100° C.;
 (b) yielding approximately 25 mole percent formic acid and a first residue when subjected to periodate oxidation;
 (c) said first residue yielding approximately 25 mole percent glycerol and an insoluble second residue when subjected to reduction by sodium borohydride followed by hydrolysis with dilute sulfuric acid;
(d) said second residue yielding only D-glucose when subjected to the enzymatic action of the beta 1,3 D-glucanase which is derived from the organism Basidiomycete No. 806; and
(e) yielding approximately equal weight fractions of D-glucose and gentiobiose when subjected to the enzymatic action of the said beta 1,3 D-glucanase.

4. A substantially water soluble polysaccharide composed of an average of at least about 120 D-glucopyranose units and having the characteristics of:
(a) yielding only D-glucose when subjected to hydrolysis by 1N sulfuric acid at approximately 100° C.;
(b) yielding approximately 25 mole percent formic acid and a first residue when subjected to periodate oxidation;
(c) said first residue yielding approximately 25 mole percent glycerol and an insoluble second residue when subjected to reduction by sodium borohydride followed by hydrolysis with dilute sulfuric acid;
(d) said second residue yielding only D-glucose when subjected to the enzymatic action of the beta 1,3 D-glucanase which is derived from the organism Basidiomycete No. 806;
(e) yielding approximately equal weight fractions of D-glucose and gentiobiose when subjected to the enzymatic action of the said beta 1,3 D-glucanase; and
(f) the ratio of the yield of said D-glucose and gentiobiose fractions being constant with respect to time throughout the enzymatic reaction of characteristic (e) above.

5. A solid high molecular weight water soluble linear polysaccharide, having the characteristics of a thickening agent in water and composed of an average of at least about 120 D-glucopyranose units, at least a portion of said units being present in the first form:

[structure showing CH₂Y glucopyranose unit]

the remainder of said units being present in the second form:

[structure showing CO₂Y glucopyranose unit]

wherein Y represents OH;
said polysaccharide forming formic acid on being subjected to periodate oxidation, the amount of said formic acid corresponding to the number of said units in said first form;
and substituted derivatives of said polysaccharide, wherein at least a portion of said Y substituents are selected from the class consisting of OR, OOCR, OCH₂COOH, OSO₃H, ONO₂, OCS₂H, and OOCNH, wherein R is a member of the class consisting of lower alkyl and phenyl.

6. In a method for producing a polysaccharide, the steps comprising:
(a) inoculating an aqueous solution containing at least one carbohydrate selected from the group consisting of sucrose, D-xylose, D-mannose, D-glucose, L-arabinose, D-galactose, D-fructose, maltose, melezitose raffinose, methyl-beta-maltoside, aesculin, cellobiose, trehalose, L-rhamnose, glycerol, cellulose and xylan, with the organism *Sclerotium glucanicum* n.sp. (NRRL 3006); and
(b) fermenting the inoculated solution at temperatures between approximately 20 and 37° C.

7. A polymer which is characterized by the structure:

$$\left[ \begin{array}{c} X_1 \\ 1 \\ \beta \\ 6\ \beta \\ G(1\rightarrow 3) \end{array} G\ \beta\ (1\rightarrow 3)\ G\ \beta\ (1\rightarrow 3)\ \begin{array}{c} X_2 \\ 1 \\ \beta \\ 6\ \beta \\ G(1\rightarrow 2)\ G \end{array} \right]_n$$

where G is characterized by the structure:

[glucopyranose structure]

and $X_1$ and $X_2$ are substituted glucopyranose having the structure:

[CH₂Y glucopyranose structure]

and Y is a member of the class consisting of OH, OR, OOCR, OCH₂COOH, OSO₃H, ONO₂, OCS₂H and OOCNH$\phi$ where R is a member of the class consisting of alkyl and aryl and $n$ is an integer having a value greater than 17.

8. The polymer of claim 7 wherein Y is OH.

9. A substantially water soluble polysaccharide composed of an average of at least about 120 D-glucopyranose units and having the characteristics of:
(a) yielding only D-glucose when subjected to hydrolysis by 1 N sulfuric acid at approximately 100° C;
(b) yielding approximately 28 mole percent formic acid and a first residue when subjected to periodate oxidation;
(c) said first residue yielding approximately 28 mole percent glycerol and an insoluble second residue when subjected to reduction by sodium borohydride followed by hydrolysis with dilute sulfuric acid;
(d) said second residue yielding only D-glucose when subjected to the enzymatic action of the beta 1,3 D-glucanase which is derived from the organism Basidiomycete No. 806; and
(e) yielding mole fractions of D-glucose and gentiobiose in a ratio of 3 moles glucose to 2 moles gentiobiose when subjected to the enzymatic action of the said beta 1,3 D-glucanase.

10. In a method for producing a polysaccharide, the steps comprising:
(a) inoculating an aqueous solution containing a carbohydrate source with at least one organism selected from the group consisting of *Sclerotium glucanicum* n.sp. (NRRL 3006); *Sclerotium coffeicolum* Stahel (American Type Culture Collection No. 15208); *Sclerotium delphinii* Stevens (American Type Culture Collection No. 15196); *Sclerotium delphinii* Gilman (American Type Culture Collection No. 15197); *Sclerotium rolfsii* Gilman (American Type Culture Collection No. 15195); *Sclerotium rolfsii* Barnett (American Type Culture Collection No. 15201);

Sclerotium rolfsii Barnett (American Type Culture Collection No. 15206); Sclerotium rolfsii Barnett (American Type Culture Collection No. 15203); Sclerotium delphinii Welch/White (American Type Culture Collection No. 15200); Corticium rolfsii (Sacc) Curzi (American Type Culture Collection No. 15212); Corticium rolfsii Curzi/Ficus (American Type Culture Collection No. 15209); Sclerotium rolfsii QM (American Type Culture Collection No. 15202); Sclerotium rolfsii QM (American Type Culture Collection No. 15204); Sclerotium delphinii Welch/Mix (American Type Culture Collection No. 15199); Sclerotium delphinii Stevens I (American Type Culture Collection No. 15194); Sclerotium rolfsii Barnett (American Type Culture Collection No. 15205); Stromatinia narcissi Groves (American Type Culture Collection No. 15213); Sclerotium gladoli Drayton/Massey (American Type Culture Collection No. 15207); Corticium rolfsii (Sacc) Curzi (American Type Culture Collection No. 15210); Corticium rolfsii Curzi/Balducci (American Type Culture Collection No. 15211) and Sclerotium delphinii Jersveld/Welch (American Type Culture Collection No. 15198); said carbohydrate source being capable of supporting the growth of said selected organisms; and
(b) fermenting the inoculated solution at temperatures conducive to growth of said organism.

11. The method of claim 10 wherein said carbohydrate source comprises at least one member of the group consisting of dextrose, sucrose, fructose, maltose, starch, arabinose, galactose, lactose, glycerol and mannose.

12. The product of claim 5 wherein the amount of formic acid formed ranges from about 21 to about 30 percent.

13. The product of claim 5 wherein at least 60 of said units are present in said first form.

14. The product of claim 13 wherein said polysaccharide is composed of an average of at least 200 glucopyanose units.

15. The product of claim 14 wherein the ratio of units in said first form to units in said second form is at least 1:2.

16. As a composition of matter, the polysaccharide of claim 12 in combination with mycelium of at least one organism selected from the group consisting of Sclerotium glucanicum n. sp. (NRRL 3006); Sclerotium coffeicolum Stahel (American Type Culture Collection No. 15208); Sclerotium delphinii Stevens (American Type Culture Collection No. 15196); Sclerotium delphinii Gilman (American Type Culture Collection No. 15197); Sclerotium rolfsii Gilman (American Type Culture Collection No. 15195); Sclerotium rolfsii Barnett (American Type Culture Collection No. 15201); Sclerotium rolfsii Barnett (American Type Culture Collection No. 15206); Sclerotium rolfsii Barnett (American Type Culture Collection No. 15203); Sclerotium delphinii Welch/White (American Type Culture Collection No. 15200); Corticum rolfsii (Sacc) Curzi (American Type Culture Collection No. 15212); Corticium rolfsii Curzi/Fiscus (American Type Culture Collection No. 15209); Sclerotium rolfsii QM (American Type Culture Collection No. 15202); Sclerotium rolfsii QM (American Type Culture Collection No. 15204); Sclerotium delphinii Welch/Mix (American Type Culture Collection No. 15199); Sclerotium delphinii Stevens I (American Type Culture Collection No. 15194); Sclerotium rolfsii Barnett (American Type Culture Collection No. 15205); Stromatinia narcissi Groves (American Type Culture Collection No. 15213); Sclerotinia gladoli Drayton/Massey (American Type Culture Collection No. 15207); Corticium rolfsii (Sacc) Curzi (American Type Culture Collection No. 15210); Corticium rolfsii Curzi/Balducci (American Type Culture Collection No. 15211); and Sclerotium delphinii Jersveld/Welch (American Type Culture Collection No. 15198).

17. The product of claim 5 wherein Y is OH.

18. A substantially water soluble polysaccharide composed of an average of at least about 120 D-glucopyranose units and having the characteristics of:
  (a) Yielding only D-glucose when subjected to hydrolysis by 1 N sulfuric acid at approximately 100° C.;
  (b) Yielding approximately 21 to 30 mole percent formic acid and a first residue when subjected to periodate oxidation;
  (c) said first residue yielding a second residue when subjected to reduction by sodium borohydride followed by hydrolysis with dilute sulfuric acid;
  (d) Said second residue yielding only D-glucose when subjected to the enzymatic action of a beta, 1,3 D-glucanase; and
  (e) Yielding only D-glucose and gentiobiose when subjected to the enzymatic action of said beta 1,3 D-glucanase.

19. The polysaccharide of claim 18 from which the molar yield of gentiobiose to glucose is at least 1:2.

20. The composition of claim 16 further characterized in that it is in the dry solid form separated from a culture medium.

21. The process of claim 10 in which the organism is selected from the group consisting of Sclerotium glucanicum n. sp. (NRRL 3006); Sclerotium rolfsii Barnett (American Type Culture Collection No. 15206); Corticium rolfsii (Sacc) Curzi (American Type Culture Collection No. 15210); Sclerotinia gladioli Drayton/Massey (American Type Culture Collection No. 15207); and, Stromatinia narcissi Groves (American Type Culture Collection No. 15213).

22. The method of claim 21 in which the organism is Sclerotium rolfsii Barnett (American Type Culture Collection No. 15206).

References Cited by the Examiner

UNITED STATES PATENTS 3,094,517   6/1963   Stanley ____________ 260—209

OTHER REFERENCES

Barker et al., Chem. and Industry, Nov. 28, 1953.

Smith et al., "The Chemistry of Plant Gums and Mucilages," page 206, 1959, Reinhold Publishing Corp., New York, N.Y.

ELBERT L. ROBERTS, Primary Examiner.

A. LOUIS MONACELL, LEWIS GOTTS, Examiners.

A. E. TANENHOLTZ, J. R. BROWN,
  Assistant Examiners.